No. 772,390. PATENTED OCT. 18, 1904.
K. ZIMPELL.
SATURATING APPARATUS FOR RECOVERING AMMONIUM SULFATE.
APPLICATION FILED MAY 31, 1904.
NO MODEL.
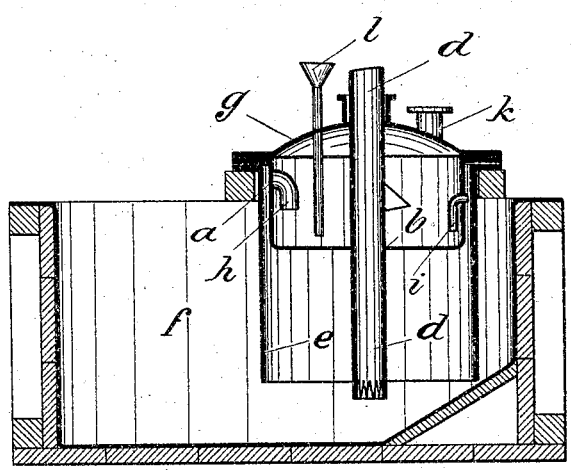

No. 772,390.       Patented October 18, 1904.

UNITED STATES PATENT OFFICE.

KARL ZIMPELL, OF STETTIN, GERMANY.

SATURATING APPARATUS FOR RECOVERING AMMONIUM SULFATE.

SPECIFICATION forming part of Letters Patent No. 772,390, dated October 18, 1904.

Application filed May 31, 1904. Serial No. 210,533. (No model.)

*To all whom it may concern:*

Be it known that I, KARL ZIMPELL, a subject of the German Emperor, and a resident of Stettin, Germany, have invented new and useful Improvements in Saturators for the Recovery of Sulfate of Ammonia from Ammonia-Gases, of which the following is a specification.

This invention relates to a saturating apparatus for the recovery of sulfate of ammonia from ammonia-gases which is so constructed that the acid is constantly kept at the same degree of concentration.

The gases of ammonia are saturated with steam so that it often happens that the acid is diluted by the condensed water of said steam. This happens the more easily the greater the surfaces are over which the gases of ammonia are conducted. The condensation of steam admixed with the gases of ammonia never occurs in the first saturating apparatus, as the heat liberated from the acid by the precipitation of the ammonia from the gases is greater than the heat required for preventing the steam from condensation. In the second saturating apparatus there is, however, only a small quantity of heat liberated, which is not sufficient to prevent the condensation of the steam, wherefrom results a continuous dilution of the acid. The purpose of this invention is to prevent this condensation by means of an improved construction of the saturating apparatus.

A saturating apparatus constructed according to my invention is shown in the accompanying drawing in a vertical section.

The second saturating vessel $b$ is inclosed in a cylinder $e$ of the main saturator, so that the waste gases coming from the first saturator $f$ surround the saturating vessel $b$, thus keeping the walls of the same heated to such a degree that a condensation of steam inside the vessel $b$ is absolutely prevented. In the walls of the vessel $b$, near the upper edge of the same, one or more openings $a$ are provided, from which short bent pipes $h$ project into vessel $b$. An overflow $i$ is provided in the vessel $b$ to keep the acid in said vessel constantly on the same level. The cylinder $e$, as well as the vessel $b$, is closed by a cover $g$, in which an outflow $k$ for the gases and a funnel $i$ for filling the acid into the vessel $b$ are arranged. In the center of the cover $g$ of vessel $b$ a downwardly-projecting feed-pipe $d$ is provided, which reaches below the level of the acid contained in the first saturating apparatus $f$.

Through said supply-pipe $d$ the ammonia-gases are supplied to the first saturating apparatus $f$, the sulfate of ammonia being precipitated by the acid contained in said vessel $f$. The gases which have not been absorbed in vessel $f$ rise into cylinder $e$, flow around vessel $b$, and enter said vessel $b$ through the openings $a$ and bent pipes $h$, respectively. The waste gases flow out from vessel $b$ through the outflow $k$.

Having fully described my invention, what I claim, and desire to secure by Letters Patent, is—

Improved saturating apparatus for the recovery of sulfate of ammonia comprising in combination a large closed saturating vessel, a downwardly-projecting cylinder in an opening of the top plate of said saturating vessel, a second saturating vessel of smaller diameter than the cylinder in the top end of said cylinder, a cover closing said second saturating vessel and the cylinder, a supply-pipe downwardly projecting through the center of the cover and bottom of the second saturating vessel reaching below the end of said cylinder, openings in the wall of the second saturating vessel near the top edge of the same, bent pipes projecting from said openings into the second vessel below the level of the acid contained in the same, an overflow in said second vessel, an outflow for the waste gases on the cover of said second vessel and a funnel for filling the acid into said second vessel, substantially as described and shown and for the purpose set forth.

In testimony whereof I have hereunto set my hand in presence of two subscribing witnesses.

KARL ZIMPELL.

Witnesses:
  JOHANNES REVLIN PERPEER,
  CARL ZIMPELL.